United States Patent
Klug

(10) Patent No.: US 10,737,620 B2
(45) Date of Patent: Aug. 11, 2020

(54) VIRTUAL MIRROR ARRANGEMENT WITH ADJUSTMENT FUNCTION VIA A MOVEMENT OF THE DISPLAY

(71) Applicant: AUDI AG, Ingolstadt (DE)

(72) Inventor: Markus Klug, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/629,384

(22) PCT Filed: Jul. 12, 2018

(86) PCT No.: PCT/EP2018/068894
§ 371 (c)(1),
(2) Date: Jan. 8, 2020

(87) PCT Pub. No.: WO2019/016060
PCT Pub. Date: Jan. 24, 2019

(65) Prior Publication Data
US 2020/0148111 A1    May 14, 2020

(30) Foreign Application Priority Data
Jul. 20, 2017    (DE) .................. 10 2017 212 519

(51) Int. Cl.
*B60R 1/00* (2006.01)
*B60K 35/00* (2006.01)
*B60R 11/04* (2006.01)
*B60K 37/06* (2006.01)

(52) U.S. Cl.
CPC ............. *B60R 1/00* (2013.01); *B60K 35/00* (2013.01); *B60R 11/04* (2013.01); *B60K 2370/176* (2019.05); *B60K 2370/21* (2019.05); *B60K 2370/52* (2019.05); *B60K 2370/67* (2019.05); *B60R 2300/101* (2013.01); *B60R 2300/8046* (2013.01)

(58) Field of Classification Search
None
See application file for complete search history.

(56) References Cited

U.S. PATENT DOCUMENTS

2017/0021770 A1    1/2017 Arai et al.

FOREIGN PATENT DOCUMENTS

| DE | 102012004639 A1 | 9/2013 |
| DE | 102012004640 A1 | 9/2013 |
| DE | 102012223479 A1 | 4/2014 |
| DE | 102014206928 A1 | 10/2015 |

(Continued)

OTHER PUBLICATIONS

German Examination Report dated Oct. 24, 2017 in corresponding German Application No. 10 2017 212 519.5; 20 pages; Machine translation attached.

(Continued)

*Primary Examiner* — Christopher Braniff
(74) *Attorney, Agent, or Firm* — Maier & Maier, PLLC

(57) ABSTRACT

A virtual mirror arrangement, in particular for a vehicle, including at least one screen arranged in the interior of a vehicle for displaying a detection region of at least one camera, where an actuator connected to the camera is controllable by a movement of the display. The disclosure further relates to a method for adjusting a virtual mirror.

14 Claims, 3 Drawing Sheets

(56) References Cited

FOREIGN PATENT DOCUMENTS

| | | | |
|---|---|---|---|
| DE | 102015209187 B3 | | 9/2016 |
| EP | 3184364 A1 | | 6/2017 |
| JP | 2009100180 A | * | 5/2009 |
| JP | 2009100180 A | | 5/2009 |

OTHER PUBLICATIONS

International Search Report dated Sep. 7, 2018 and Written Opinion in corresponding International Application No. PCT/EP2018/068894; 21 pages; Machine translation attached.
International Preliminary Report on Patentability dated Aug. 26, 2019 and Written Opinion in corresponding International Application No. PCT/EP2018/068894; 20 pages; Machine translation attached.

* cited by examiner

VIRTUAL MIRROR ARRANGEMENT WITH ADJUSTMENT FUNCTION VIA A MOVEMENT OF THE DISPLAY

FIELD

The present disclosure relates to a virtual mirror arrangement, in particular for a vehicle, including at least one screen arranged in the interior of a vehicle for displaying a detection region of at least one camera, where an actuator connected to the camera is controllable by a movement of the display. The disclosure further relates to a method for adjusting a virtual mirror.

BACKGROUND

To optimize an aerodynamic behavior of vehicles, preferably virtual mirrors may be used. For this purpose, cameras are installed on the outer contour of the vehicle in the body. The respective detection regions of the cameras are transmitted to one or more screens arranged in the vehicle interior, so that instead of conventional mirrors, screens allow, for example, a view behind the vehicle.

DE 10 2012 004 640 A1 discloses a motor vehicle with an electronic rear mirror. A touchscreen is used to display the rearview mirror and to pivot an external camera.

DE 10 2012 004 639 A1 discloses a motor vehicle with an electronic rearview mirror. A touchpad is used to tilt an external camera.

DE 10 2015 209 187 B3 discloses a monitoring device for a motor vehicle. Actuators controllable from a vehicle interior are used to adjust a camera device.

SUMMARY

However, the already disclosed devices do not allow the user to perform a usual, analog procedure when adjusting the viewing area of a virtual mirror or a camera as accustomed to. The use of joysticks or flip switches to set a viewing area comfortable for the occupant of the vehicle is often awkward and partially difficult to implement. This means that the advantages of digitization cannot be fully exploited.

The disclosure therefore has the objective of providing a virtual mirror arrangement that is intuitively adjustable.

To achieve the objective, the present invention provides a virtual mirror arrangement, in particular for a vehicle, comprising at least one screen arranged in the interior of a vehicle for displaying a detection region of at least one camera, at least one actuator to orient the at least one camera, and a controller to control the at least one actuator. The least one screen is movable and the at least one actuator is controllable by at least one movement of the screen.

The camera is thus oriented via a mechanical movement of the display. The vehicle occupant or a user moves the display or screen corresponding to the orientation of the camera as if the screen itself were a mirror. The virtual mirror image or display of the screen act analog to the movement of the screen as if moving an analog mirror.

The at least one camera is arranged at an exterior of the vehicle. The at least one camera may also be directed into an interior area. The at least one camera is equipped with servo motors to adjust the camera. This allows varying the camera orientation and thus also the viewing area of the camera on the screen.

The user can "adjust the mirror" the way he is used to, while being able to access additional features, such as a zoom feature by pulling and pushing the display. This intuitive procedure that is analog to a process of adjusting a conventional mirror can thus be digitally implemented and simplify the operation or adjustment of a virtual mirror arrangement for the user.

According to one embodiment, the at least one movement of the at least one screen is detectable by at least one sensor. The displays for the digital outside mirrors may be equipped with different sensors to detect the position of the respective displays, such as by optical sensors, accelerometers, gyroscopes, strain gauges, torque sensors, potentiometers, pressure sensors, contact switches, capacitance measurement and the like. This allows accurately tracking and an orientation or movement of the screen and transferring it to the controller.

According to another embodiment, the at least one sensor is connected to the controller. The at least one sensor can be continuously assessed by the controller. In particular, this allows for interpreting any movement or deflection of the screen.

In accordance with another exemplary embodiment, the movement of the screen determined by the at least one sensor can be implemented in an orientation of the at least one camera by the controller. For this purpose, a controller takes over the assessment of the display positions and the setting of the cameras, such as the position and the focal length. As a result, the controller can control the actuators based on an optical beam path of conventional mirrors depending on a mechanical movement or deflection of the screen and enable a known and intuitive adjustment of a virtual mirror.

Pursuant to another exemplary embodiment, the at least one screen returns to a basic position after a movement and/or deflection. The movement of the display is implemented directly into a position and focus width change of the cameras. The position of the display does not necessarily have to remain in the selected position. Rather, the display may function as a "flip switch" so that the display returns to its original position after the mechanical deflection.

According to another embodiment, the at least one screen retains its position after a movement and/or deflection. To simplify the operation and to support the camera setting, the display or the screen may remain in its set position. As a result, a position last set remains visible to the user or driver and can be more easily understood.

The invention also relates to a method to adjust at least one virtual mirror of a virtual mirror arrangement, wherein at least one camera is oriented in accordance with a movement and/or deflection of at least one screen.

Here, the screen for displaying an image of a camera can be used as a virtual mirror for controlling and adjusting the camera. In particular, a mechanical influence on the screen by a user can result in a direct movement or orientation of the camera and thus in the image display on the screen. It can be operated in the same way as a conventional rear-view mirror and can therefore be carried out particularly intuitively. This enables the user to operate or adjust the virtual mirror easily.

According to a further embodiment, the at least one camera is pivoted horizontally by at least one horizontal tilting movement of the at least one screen. If, for example, the display is touched on the right or left edge of the screen and pressed away from the user, the camera moves according to the display and the image section moves to the right or left. If the edge of the screen is drawn towards the user, the detection region of the camera is moved in the opposite direction by at least one actuator, so that the section shown on the screen is moved back.

According to another embodiment, the at least one camera is pivoted vertically by at least one vertical tilting movement of the at least one screen. Analog to a vertical orientation of the camera, a horizontal deflection of the virtual mirror may be performed. If the screen is touched on a top or bottom edge, the image section or the detection region changes horizontally by a vertical pivoting movement of the camera.

According to another exemplary embodiment, a focus width of the at least one camera is reduced by pushing the at least one screen. In contrast to conventional outside mirrors, the display may also be pushed forward. If the display is pushed forward, the image section changes like a so-called zoom lens. In this way, an actuator may reduce the focal length of a lens of the at least one camera, so that a larger detection region may be covered by the camera.

According to another embodiment, the focal width of the at least one camera is increased by pulling the at least one screen. If the display is pulled closer, the focal width of the camera is increased by an actuator and the image section displayed on the screen changes. By increasing the focal width, a section of the detection region of the camera can be enlarged similar to a telephoto lens.

If the display is shifted to the side or up or down, the image section can also be shifted with a parallel movement of the camera.

According to another embodiment, the at least one camera is rotated by rotating the at least one screen about an optical axis. On the one hand, this movement can be assigned a zoom feature of the camera, on the other hand, the image section can be adjusted accordingly by rotating the camera.

BRIEF DESCRIPTION OF THE DRAWING

Embodiment of the invention are illustrated schematically in the drawings using embodiments and is further described with reference to the drawings. It shows.

DETAILED DESCRIPTION

In the figures, the same design elements have the same reference numbers.

Figure 1:
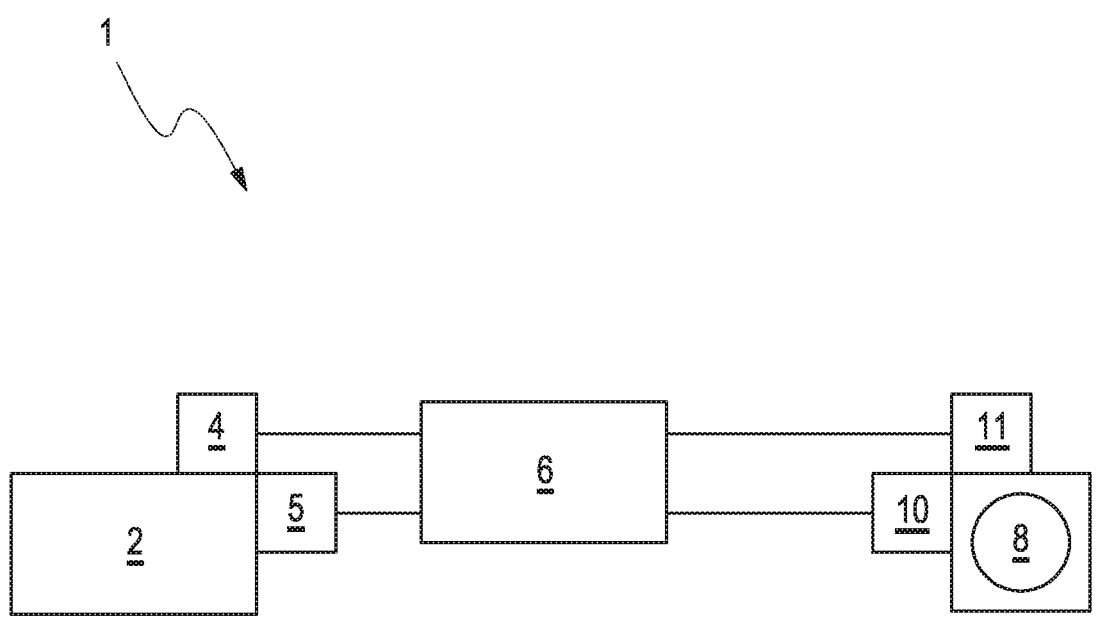
FIG. 1 as a schematic representation of a virtual mirror arrangement according to an embodiment of the invention.

FIG. 1 shows schematically a virtual mirror arrangement 1 according to an embodiment of the invention. The arrangement 1 comprises a screen or in display 2. The display 2 is movably mounted. According to the exemplary embodiment, two sensors 4, 5 are mechanically coupled with the display 2.

The sensors 4, 5 may determine how the display 2 is moved by a user. The sensors 4, 5 are here mechanical sensors to determine a vertical and horizontal tilting movement of display 2. For convenience, no further sensors are depicted. The depicted sensors 4, 5 are connected to a controller 6.

The controller 6 may receive and assess the sensor measurement data determined by the sensors 4, 5. The movement of the display 2 is used as direct control input for at least one setting of a camera 8. Based on the assessed sensor measurement data of the two sensors 4, 5, actuators 10. 11 arranged on the camera 8 and controlled by the controller 6 may act on the camera 8.

In accordance with the already mentioned simplification, two actuators 10, 11 are shown for horizontal and vertical pivoting of the camera 8. By horizontally or vertically pivoting the camera 8 by the two actuators 10, 11, a detection region of the camera 8 may be shifted. The detection region of the camera 8 is displayed directly on the display 2. Thus, the detection region displayed on the display 2 can be intuitively adjusted analog to a conventional mirror. Depending on the magnitude of a tilting movement of display 2, the controller 6 may apply a different voltage to the actuators 10, 11 and may mechanically pivot the camera 8 faster or slower.

Figure 2:
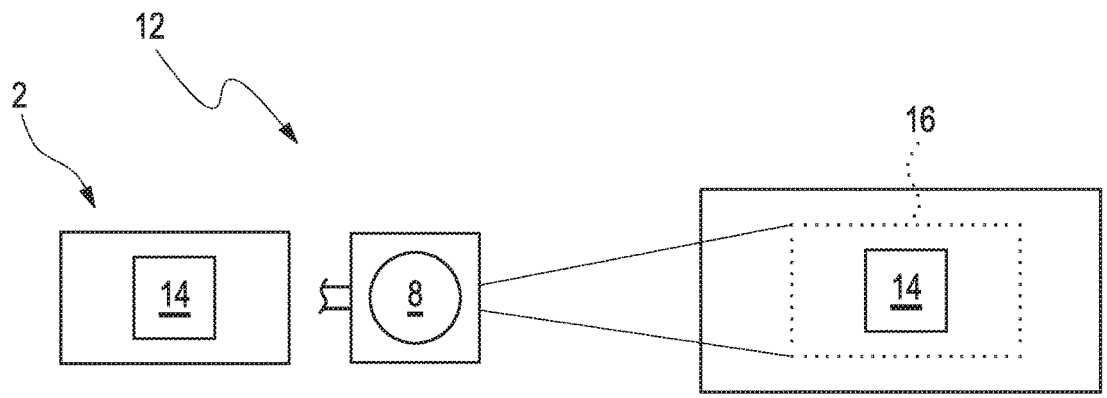
FIG. 2 as a schematic representation of different movement possibilities of the screen to clarify the method according to the invention; a) basic position; b) horizontal tilting movement; c) vertical tilting movement; d) pushing; e) pulling; f) rotational movement.
Figure 2:
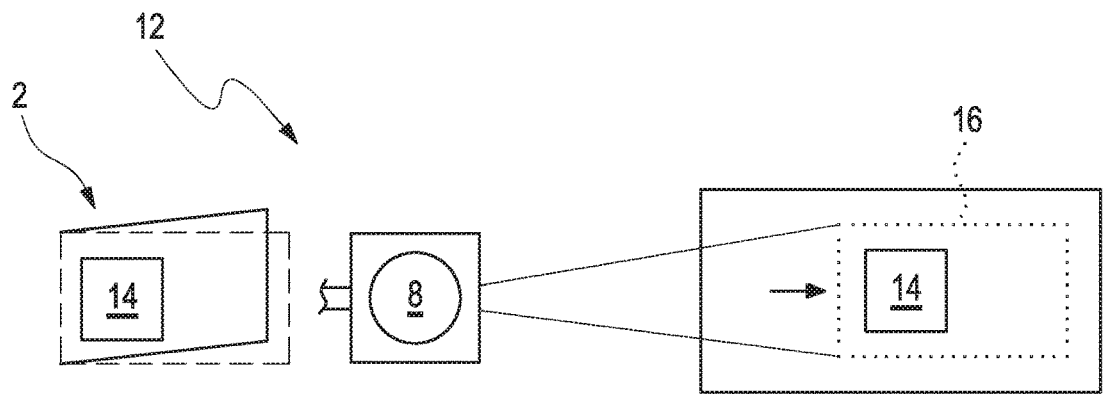
Figure 2:
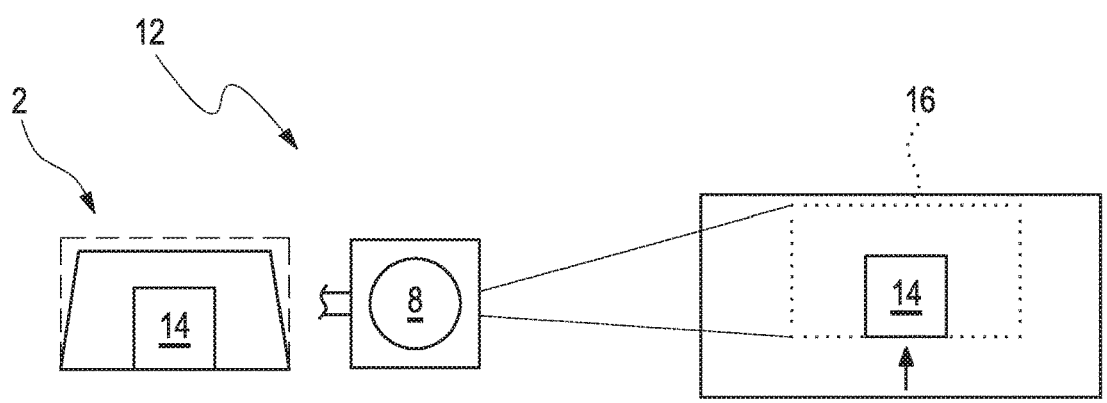
Figure 2:
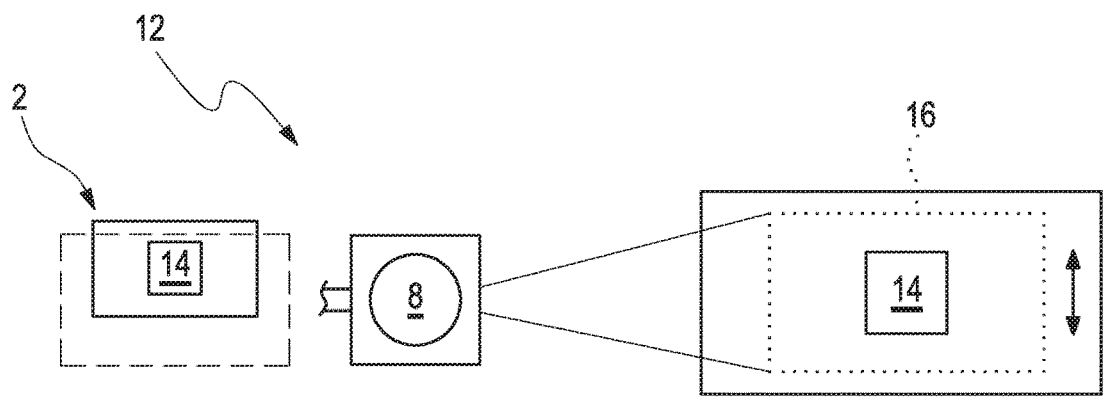
Figure 2:
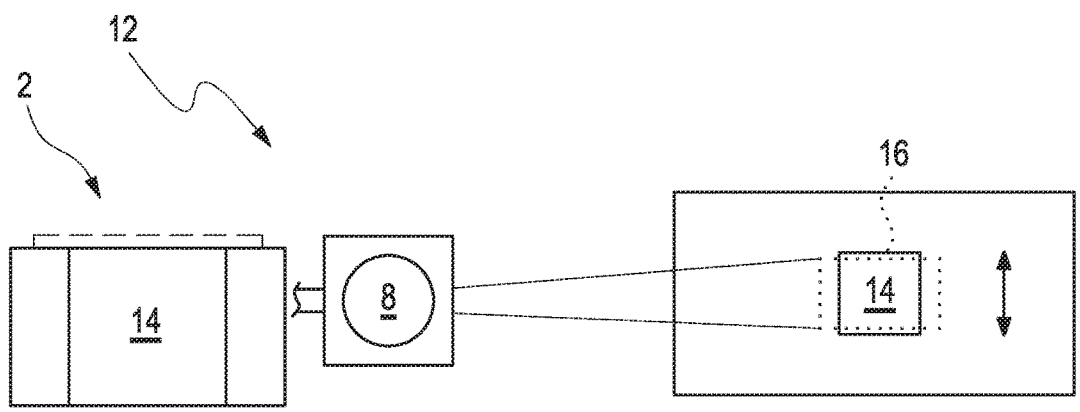
Figure 2:
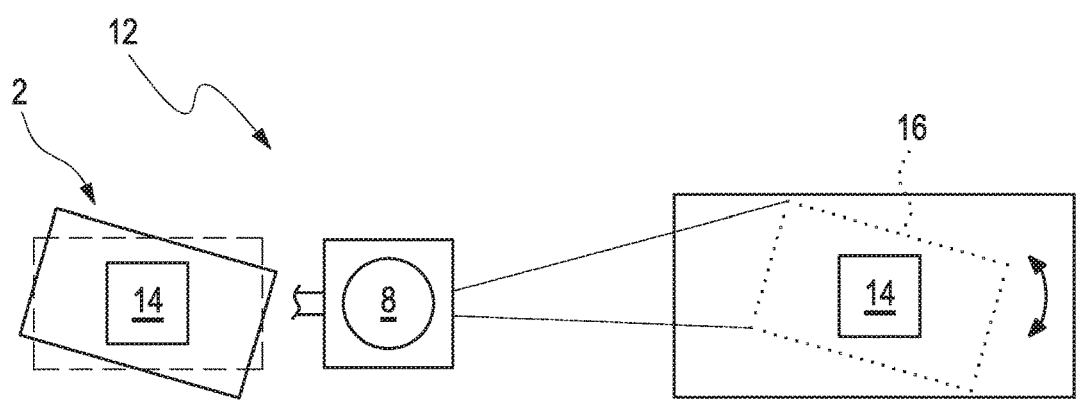

FIG. 2 illustrates schematically different movement possibilities of the screen 2 or display 2 to clarify the method 12 according to the invention. In particular, the display 2 is depicted in dotted lines in its original position to clarify at least one movement. An object 14 is arranged in the dotted detection region 16 of the camera 8 to demonstrate an influence of the respective settings of the display 2 and the camera 8. The arrows in the respective figures illustrate respective deflections of the camera 8 and the resulting changes of the detection region 16.

FIG. 2a shows the display 2 in a basic position. According to the exemplary embodiment, the object 14 is arranged in the detection region 16 of the camera 8 and in the middle of the display 2 when in basic position.

FIG. 2b shows a horizontal tilting movement of the display 2. The display 2 on a right edge of the display 2 was pushed away by a user. As a result, the camera 8 may, through the control of the actuators 10, 11 by the controller 6, be pivoted such that the detection region 16 is shifted to the right, as indicated by the arrow.

FIG. 2c illustrates a horizontal tilting movement of the display 2 by pressing an upper edge of the display 2. In this case, the actuators 10, 11 are driven by the controller 6 such that the camera 8 is pivoted upwards and the detection region 16 of the camera 8, such as indicated by arrow, is also shifted upwards.

FIG. 2d illustrates a pushing of the display 2 away from the user. As a result, an actuator in a lens of the camera 8 may be controlled by the controller 6 and a focal width of the camera 8 may be reduced. This enables a so-called "zooming out" of the detection region 16, by means of which a detection region 16, as indicated by a double arrow, is enlarged.

FIG. 2e shows a pulling of the display 2 towards the user. This enables an opposite effect to the sequence shown in FIG. 2d. By pulling the display 2, the actuator, for varying a focal width of the camera 8, is driven by the controller such that the focal width is increased. By increasing the focal width, a so-called "zooming in" may be realized, as a result of which the detection region 16 of the camera 8 is reduced and the object 14, as indicated by the double arrow, is enlarged.

FIG. 2e shows a rotational movement of the display 2, whereby the camera 8 is rotated by an actuator about an optical axis of the camera 8. As a result, the detection region 16, as indicated by an arc-shaped arrow, and the image shown on the display 2 are also shown rotated.

The invention claimed is:

1. A virtual mirror arrangement, in particular for a vehicle, comprising:
at least one screen arranged in the interior of a vehicle for displaying a detection region of at least one camera, comprising at least one actuator to orient the at least one camera, and a controller to control the at least one actuator, where the at least one screen is movable and the at least one actuator is controllable by at least one movement of the screen, wherein the at least one screen is adapted to perform a horizontal tilting movement, a vertical tilting movement, a rotational movement, and a translation movement, and the at least one actuator is adapted to horizontally pivot the at least one camera upon a horizontal tilting movement of the at least one screen; to vertically pivot the at least one camera upon a vertical tilting movement of the at least one screen; to rotate the at least one camera about an optical axis upon a rotational movement of the at least one screen, to reduce a focal width of the at least one camera upon pushing the at least one screen and to increase the focal width of the at least one camera upon pulling the at least one screen.

2. The virtual mirror arrangement of claim 1, wherein the at least one movement of the at least one screen can be determined by at least one sensor.

3. The virtual mirror arrangement of claim 2, wherein the at least one sensor is connected with the controller for data exchange.

4. The virtual mirror arrangement of claim 1, wherein the at least one screen is adapted to return to a basic position after a movement and/or deflection.

5. The virtual mirror arrangement of claim 1, wherein the at least one screen is adapted to retain its position after a movement and/or deflection.

6. A method to adjust at least one virtual mirror of a virtual mirror arrangement according to claim 1, wherein the at least one camera is oriented in accordance with a movement and deflection of the at least one screen, wherein the at least one camera is pivoted horizontally by at least one horizontal tilting movement of the at least one screen and vertically by at least one vertical tilting movement of the at least one screen, wherein a focal width of the at least one camera is reduced by pushing the at least one screen and increased by pulling the at least one screen and the at least one camera is rotated by rotating the at least one screen about an optical axis.

7. The virtual mirror arrangement of claim 2, wherein the at least one screen is adapted to return to a basic position after a movement and/or deflection.

8. The virtual mirror arrangement of claim 3, wherein the at least one screen is adapted to return to a basic position after a movement and/or deflection.

9. The virtual mirror arrangement of claim 2, wherein the at least one screen is adapted to retain its position after a movement and/or deflection.

10. The virtual mirror arrangement of claim 3, wherein the at least one screen is adapted to retain its position after a movement and/or deflection.

11. A method to adjust at least one virtual mirror of a virtual mirror arrangement according to claim 2, wherein the at least one camera is oriented in accordance with a movement and deflection of the at least one screen, wherein the at least one camera is pivoted horizontally by at least one horizontal tilting movement of the at least one screen and vertically by at least one vertical tilting movement of the at least one screen, wherein a focal width of the at least one camera is reduced by pushing the at least one screen and increased by pulling the at least one screen and the at least one camera is rotated by rotating the at least one screen about an optical axis.

12. A method to adjust at least one virtual mirror of a virtual mirror arrangement according to claim 3, wherein the at least one camera is oriented in accordance with a movement and deflection of the at least one screen, wherein the at least one camera is pivoted horizontally by at least one horizontal tilting movement of the at least one screen and vertically by at least one vertical tilting movement of the at least one screen, wherein a focal width of the at least one camera is reduced by pushing the at least one screen and increased by pulling the at least one screen and the at least one camera is rotated by rotating the at least one screen about an optical axis.

13. A method to adjust at least one virtual mirror of a virtual mirror arrangement according to claim 4, wherein the at least one camera is oriented in accordance with a movement and deflection of the at least one screen, wherein the at least one camera is pivoted horizontally by at least one horizontal tilting movement of the at least one screen and vertically by at least one vertical tilting movement of the at least one screen, wherein a focal width of the at least one camera is reduced by pushing the at least one screen and increased by pulling the at least one screen and the at least one camera is rotated by rotating the at least one screen about an optical axis.

14. A method to adjust at least one virtual mirror of a virtual mirror arrangement according to claim 5, wherein the at least one camera is oriented in accordance with a movement and deflection of the at least one screen, wherein the at least one camera is pivoted horizontally by at least one horizontal tilting movement of the at least one screen and vertically by at least one vertical tilting movement of the at least one screen, wherein a focal width of the at least one camera is reduced by pushing the at least one screen and increased by pulling the at least one screen and the at least one camera is rotated by rotating the at least one screen about an optical axis.

* * * * *